Nov. 3, 1959 H. C. EBERLY 2,910,931
HAY BALERS
Filed May 14, 1957 3 Sheets-Sheet 1
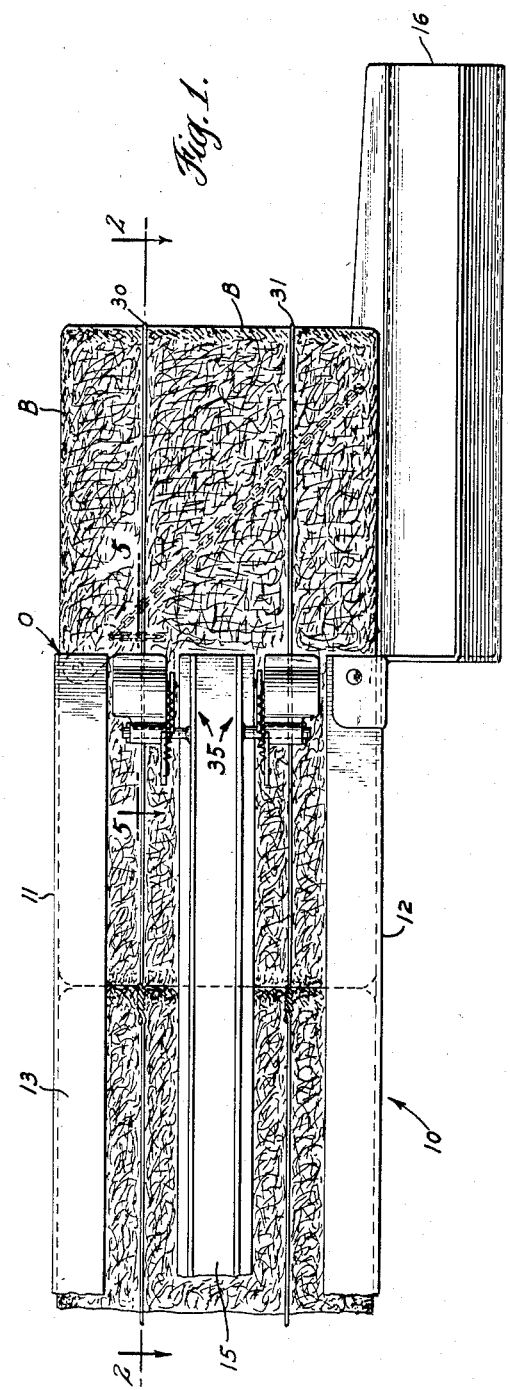
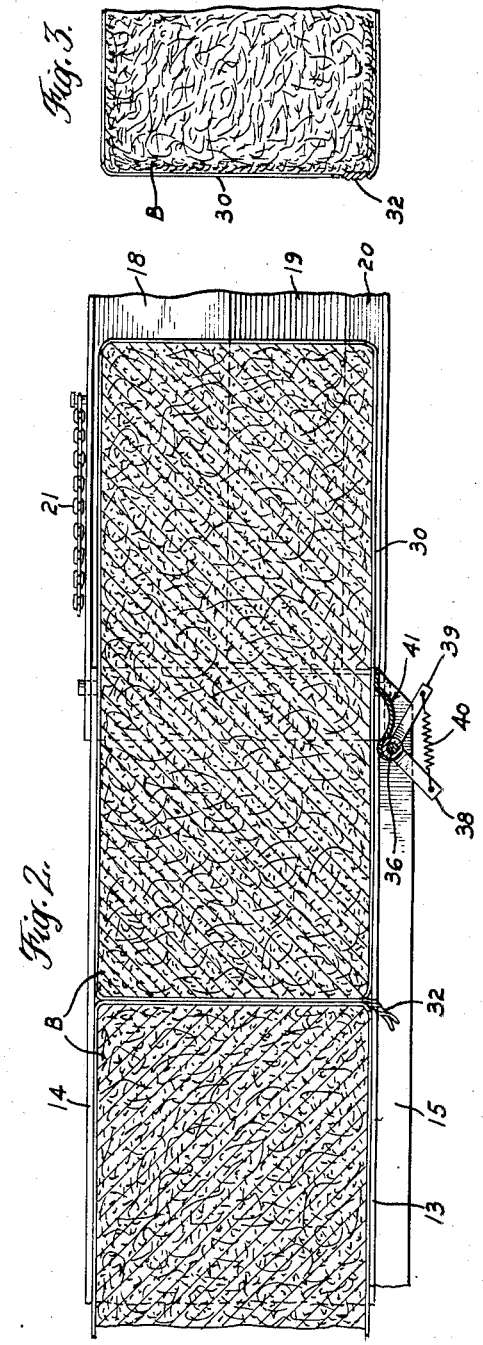
INVENTOR
HARRY C. EBERLY
Joseph Allen Brown
ATTORNEY Nov. 3, 1959 H. C. EBERLY 2,910,931
HAY BALERS
Filed May 14, 1957 3 Sheets-Sheet 2
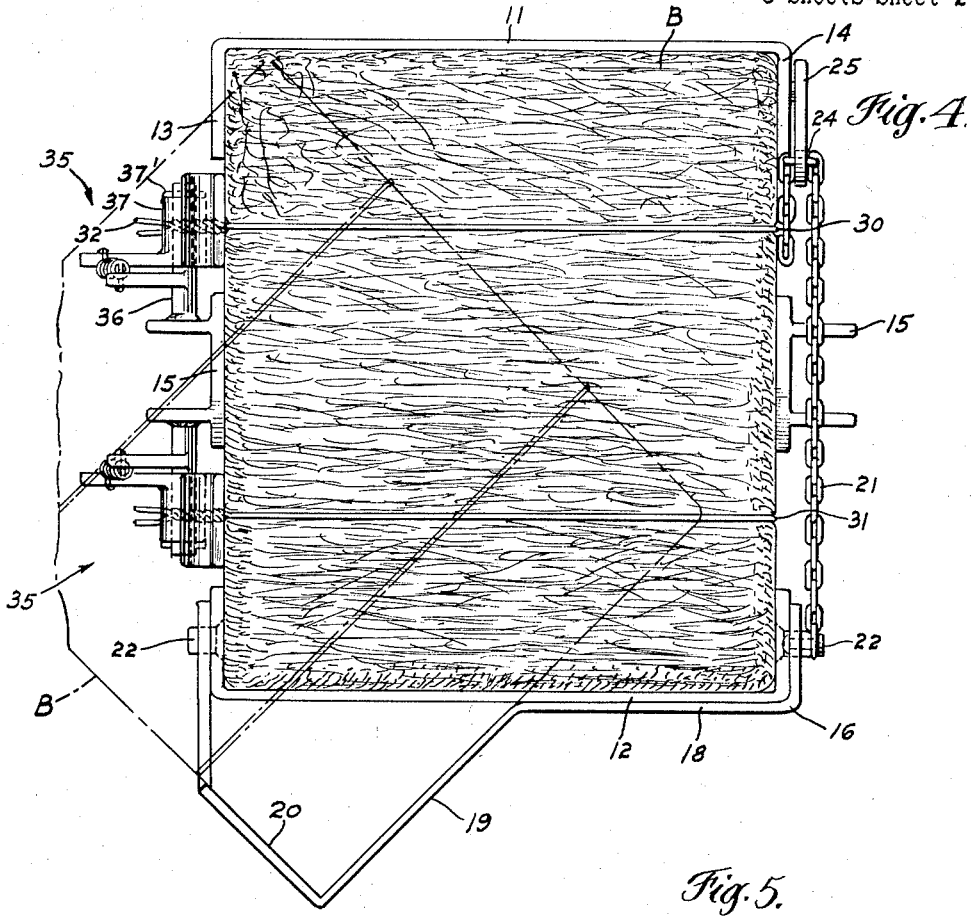
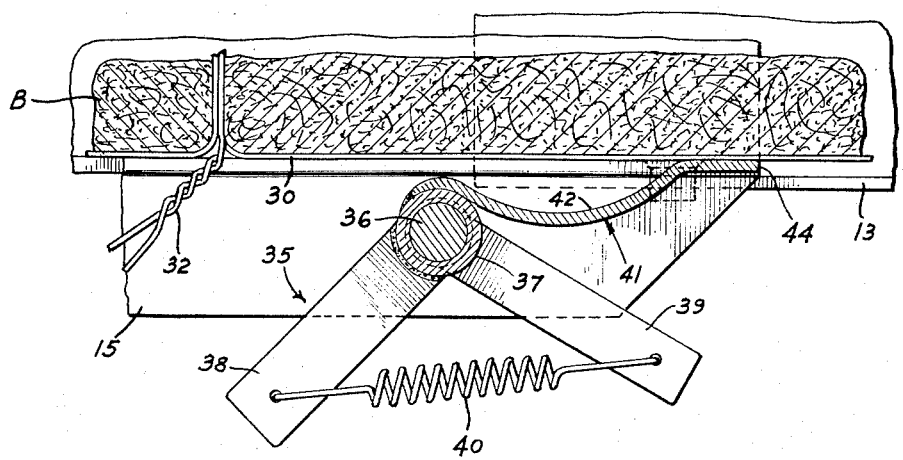
INVENTOR
HARRY C. EBERLY
ATTORNEY

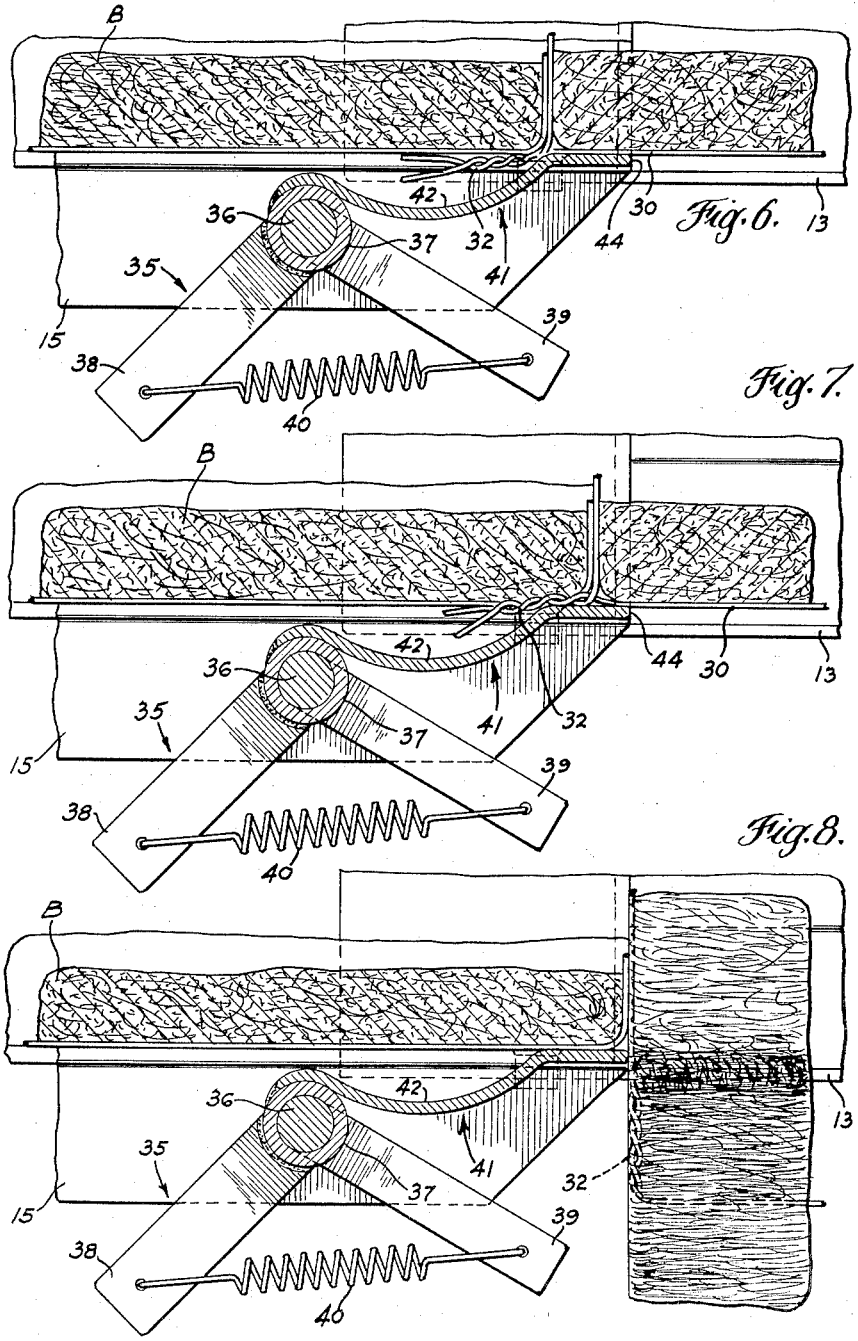

United States Patent Office 2,910,931
Patented Nov. 3, 1959

2,910,931
HAY BALERS

Harry C. Eberly, Narvon, Pa., assignor to Sperry Rand Corporation, New Holland, Pa., a corporation of Delaware Application May 14, 1957, Serial No. 659,144

5 Claims. (Cl. 100—1)

The present invention relates to wire tie hay balers of the type wherein the ends of a loop of wire passing around a bale are fastened together by twisting the wires with a twister hook. More particularly, the invention relates to a wire deflector for such a baler.

A baler of the type referred to above is shown and described in Burford, U.S. Patent No. 2,551,873, issued May 8, 1951. In the Burford baler, two loops of wire are projected around two lateral sides, the front and rear ends of each bale, the twists being made adjacent a corner formed by one side and the rear end of each bale. The twists project obliquely from said corner, presenting two relatively sharp wire ends.

After the bales are completed, they are deposited on the ground or onto a trailing wagon. In either case, the bales have to be manually handled. Heretofore, the twists have caused difficulty in that they catch on clothes and cause tears and/or engage the bale gatherer's body causing cuts and scratches.

The primary object of this invention is to provide means for deflecting or bending wire twists of the character described before the bales are discharged from the baler so that the amount of projection of the twists from the bales will be reduced to thereby lessen the chance of the twists catching onto something and causing damage.

Another object of this invention is to provide deflecting means which is of very simple construction and low cost and capable of being readily mounted on existing balers of the character described.

A further object of this invention is to provide deflecting means so mounted relative to a bale chute on the baler that the bale chute cooperates with the deflecting means in obtaining a desired deflection of the twists.

Other objects of this invention will be apparent hereinafter from the specification and from the recital in the appended claims.

In the drawings:

Fig. 1 is a fragmentary side elevation of the rear end of a bale case having mounted thereon a pair of twist deflectors constructed according to one embodiment of this invention;

Fig. 2 is a section taken on the line 2—2 of Fig. 1 and looking in the direction of the arrows;

Fig. 3 is a view showing the position of the twist after it has been operated upon by the deflector of this invention;

Fig. 4 is an end elevation looking from right to left in Fig. 1 and showing a bale as it emerges from the bale case in solid lines, and such bale in dotted lines after it has tilted laterally on the bale chute of the baler; and Figs. 5 through 8 illustrate sequentially the manner in which the projecting wire twists are deflected before and as the bale is discharged.

Referring now to the drawings by numerals of reference, 10 denotes a conventional rectangular bale case comprising top and bottom walls 11 and 12, and side walls 13 and 14 each of which comprises spaced upper and lower longitudinal portions. Extending in each side wall space is a tension rail 15 mounted in conventional fashion, not shown, for inward or outward movement relative to the bales B formed in the bale case and positionable responsive to conventional bale control means for regulating the density of the bales formed. Sides 13 and 14 and tension rail 15 are co-extensive, each ending at substantially the same point.

The bales B in bale chamber 10 move from left to right of Fig. 1 as they are formed. Each successive charge of hay delivered to the bale chamber is compressed by a reciprocating plunger, not shown, which, in addition to compressing the hay, pushes the bales towards the bale chamber outlet O. The bale case is of such length that there is always a completed and tied bale in the bale chamber to form a backing against which a new bale is formed. When the bale being formed is completed, the previous bale against which it abuts is discharged.

As each bale is discharged, it is deposited onto a "flip-over" bale chute 16 pivotally connected to the end of the bale case. Chute 16 has a horizontal portion or ledge 18 and an inclined portion 19 (Fig. 4) up-turned at its lower end 20. The width of ledge 18 is less than one-half the width of the bales formed in chamber 10. Thus, once the bales are on the bale chute, and clear of the bale chamber, they will topple laterally onto the surface 19 and against the up-turned flange 20. Flange 20 causes the bales to flip as they are discharged so that they will roll clear of the baler and out of the way so as not to interfere with the baler operation when the baler is operated in the adjoining hay windrow next trip around the field.

Bale chute 16 communicates with the outlet O of the bale case and its ledge 18 is to all extents and purposes an extension of lower wall 12 of the bale case. The bale chute is maintained in generally horizontally extending position by means of a diagonally extending chain 21 connected at 22 to the bale chute and at 24 to a bracket 25 pivoted on side 14 of the bale case. Bracket 25 has a slot through which chain 21 extends, the extension of the bale chute being adjustable according to the particular link of the chain disposed in such slot.

In the bale case illustrated, the bales formed therein are banded by wires 30 and 31 which extend horizontally around two sides, the forward and rear ends of the bales. The twists denoted 32 are disposed substantially at the corner formed by one side and the rear end of each bale. As shown best in Fig. 2, the twist projects obliquely from such corner of the bale and outwardly relative to the bale case. It should be further noted that the twist is on the same side of the bale case as the inclined portion 19 on the bale chute 16. Thus, as each bale is discharged, it is tipped over toward the side of the bale which has the twist.

Mounted on tension rail 15 adjacent the free or rear end thereof are two twist deflectors 35, each of identical construction except that one deflector projects upwardly from the rail and the other downwardly therefrom. Each deflector comprises a pin 36 welded at one end to the tension rail. Surrounding pin 36 is a sleeve 37 which is freely rotatable on the pin and held from sliding off the pin by a cotter pin 37' (Fig. 4) or the like. Welded to sleeve 37 and extending radially therefrom is a crank arm 38. Welded to pin 36 and extending radially therefrom and spaced angularly from crank arm 38 is an arm 39. Arms 38 and 39 are connected by a spring 40 which constantly urges arm 38 to rotate counter-clockwise when the deflector is viewed as shown in Fig. 5. Welded to sleeve 37 is a deflecting member 41 having a bowed portion 42 bowed outwardly from the bale case and having a free end pad 44 projecting between the space between tension rail 15 and the upper or lower portion of side 13 of the bale case, as the case may be. The end pads 44 of the deflecting members abut and slide against the bales as they progressively move through bale case 10; and, they engage the loops of wire extending around the bales.

As shown in Figs. 5, 6, and 7, as a twist 32 approaches a deflector, it engages deflector 41 which bends and presses the twist inwardly of the bale case whereby the twist assumes an extension (Fig. 7) generally parallel to the adjacent side of the bale. In some balers, the twist root is an inch or two from the corner of the bale (see Burford patent). Thus, when the twist is bent inwardly, it is disposed flush against the bale where it is out of the way. In such balers, the deflectors will have completely performed its function before the bales are discharged. However, in other balers, the twisting mechanism is adjusted so that the twist is formed right at the corner and deflecting it inwardly causes it to extend forwardly of the bale end. To eliminate such forward extension, bale chute 16 cooperates with the deflector.

As stated above, when the bale clears the bale case, it topples laterally. As this happens, the rearwardly projecting twist being in engagement with the end 44 of the deflector (Fig. 7) is bent against the forward end of the bale (Fig. 8) whereupon it assumes a position as shown in Fig. 3.

It is thus seen, that the deflector first bends or deflects the twist inwardly towards the bale and then, as the bale topples laterally relative to the bale case and off the bale chute, the twist is bent around the forward end of the bale. The twist is now out of the way and less liable to catch onto the clothes or the operator's body where it may cause damage or injury.

Bending the twist so that it does not project obliquely in and of itself is a substantial improvement from a bale handling standpoint. The bending of the twist around the front end of the bale provides a further improvement. This last bending action is made possible by the novel disposition of the deflector in combination with a bale chute which topples the bales laterally, as described.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. In a wire tie hay baler having a bale forming case provided with an outlet toward which each bale is progressively moved as it is formed and through which it is discharged, each bale upon completion and before discharge being banded by loops of wire the ends of which are twisted together, such twists projecting laterally outwardly from a point adjacent a corner formed by one side and the front end of the bale, the combination of means mounted on the side of said bale case co-extensive with said one side of the bale and engageable with said twists to deflect the twists inwardly before the bales are discharged through said outlet, said means comprising a deflecting member having one end pivoted to said bale case and a free end engageable with wire twists on each bale as the bales move by, and means biasing said free end toward each bale.

2. In a wire tie hay baler as recited in claim 1, deflector means comprising a pivot pin on said bale case, a sleeve rotatable on said pin, a crank arm extending radially from said sleeve, a radially extending deflecting member having one end connected to said sleeve and a free end engageable with wire twists on said bales, a radial lever arm fixed to said pin and spaced angularly relative to said crank arm, and a tension spring connected between said crank and lever arms to bias said free end of said deflecting member against said bales.

3. In a wire tie hay baler having a bale case provided with an outlet toward which bales are progressively moved as they are formed in the case and through which they are discharged, a chute which receives each bale as it is discharged and tips it laterally as soon as the bale is clear of the bale case, each bale upon completion and before discharge onto said chute being banded by loops of wire the ends of which are twisted together at a point adjacent a corner formed by one side and the front of the bale, such twists projecting laterally and rearwardly from the sides of the bales, the combination of means mounted on said bale case for engagement with said twists and cooperative with said bale chute for deflecting the twists as the bales fall laterally and free of the baler, said means comprising a deflecting member having one end pivoted to said bale case and a free end engageable with said wire twists on said bales, said free end being disposed proximate to said outlet for engagement with said twists as the bales topple off said chute to bend the twists around the ends of said bales.

4. In a wire tie hay baler, a bale case provided with an outlet toward which bales are progressively moved as they are formed in the case and through which they are discharged, a chute connected to said baler and disposed to receive each bale as it is discharged, said chute including a longitudinal ledge on which each bale slides, the disposition and width of said ledge being such that less than one-half the width of each bale is supported thereon thereby causing each bale to topple laterally once it is clear of said bale case, each bale upon completion and before discharge onto said chute being banded by horizontally extending loops of wire the ends of which are twisted together at a point adjacent a corner formed by one side and the front of the bale, such twists projecting laterally and rearwardly from said one side of the bale, the combination of means mounted on said bale case for engagement with said twists and cooperative with said bale chute for deflecting the twists inwardly as the bales fall laterally from said chute, said deflecting means comprising a deflector for the twist of each wire loop, each deflector comprising a deflecting member pivoted on said bale case and having a free end portion engageable with wire twists, said free end being adjacent said outlet and engageable with said twists as the bales are toppled laterally from said chute, and means for biasing said free end toward said bale case.

5. In a wire tie hay baler having a bale forming case provided with an outlet toward which each bale is progressively moved as it is formed and through which it is discharged, each bale upon completion and before discharge being banded by loops of wire the ends of which are twisted together, such twists projecting laterally outwardly from a point adjacent a corner formed by one side and the front end of the bale, the combination of means mounted on the side of said bale case coextensive with said one side of the bale and engageable with said twists to deflect the twists inwardly before the bales are discharged through said outlet, said deflector means comprising a deflector member, means mounting said deflector member for movement toward and away from each bale in said bale case, and means biasing said deflector toward each bale.

References Cited in the file of this patent
UNITED STATES PATENTS

| 2,367,180 | Belt | Jan. 16, 1945 |
| 2,458,994 | Hill | Jan. 11, 1949 |